United States Patent
Sadil et al.

(10) Patent No.: US 9,140,213 B2
(45) Date of Patent: Sep. 22, 2015

(54) LEAF SPRING DAMPER FOR A TURBINE ENGINE FUEL DELIVERY SYSTEM

(75) Inventors: Andreas Sadil, Newington, CT (US); Marc J. Muldoon, Malborough, CT (US); Bessem Jlidi, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 929 days.

(21) Appl. No.: 13/312,621

(22) Filed: Dec. 6, 2011

(65) Prior Publication Data

US 2013/0139512 A1 Jun. 6, 2013

(51) Int. Cl.
| | |
|---|---|
| F02K 3/10 | (2006.01) |
| F23R 3/20 | (2006.01) |
| F23R 3/28 | (2006.01) |
| F02C 7/22 | (2006.01) |

(52) U.S. Cl.
CPC . *F02K 3/10* (2013.01); *F02C 7/222* (2013.01); *F23R 3/20* (2013.01); *F23R 3/283* (2013.01); *F05D 2260/96* (2013.01)

(58) Field of Classification Search
CPC ............. F02K 3/10; F02K 3/08; F02K 3/105; F02K 3/11; F23R 3/18; F23R 3/20; F23R 3/283; F02C 7/222; F02C 7/22; F05D 2260/96
USPC ................... 60/761, 765, 766, 796, 797, 800
See application file for complete search history.

(56) References Cited

U.S. PATENT DOCUMENTS

| | | | | |
|---|---|---|---|---|
| 5,287,697 | A * | 2/1994 | Johnson et al. | 60/226.3 |
| 5,343,697 | A * | 9/1994 | Johnson et al. | 60/226.3 |
| 5,417,056 | A * | 5/1995 | Johnson et al. | 60/260 |
| 6,682,300 | B2 | 1/2004 | Bolms | |
| 6,733,233 | B2 | 5/2004 | Jasklowski et al. | |
| 6,742,782 | B2 | 6/2004 | Beichl | |
| 7,578,131 | B2 | 8/2009 | Muldoon et al. | |
| 7,635,056 | B2 | 12/2009 | Orlamunder et al. | |
| 7,647,775 | B2 | 1/2010 | Muldoon et al. | |
| 7,661,273 | B2 * | 2/2010 | Commaret et al. | 60/799 |
| 7,806,410 | B2 * | 10/2010 | El-Aini et al. | 277/413 |
| 7,854,124 | B2 | 12/2010 | Sadil et al. | |
| 7,966,819 | B2 * | 6/2011 | Bishara et al. | 60/740 |
| 8,015,996 | B2 | 9/2011 | Sadil et al. | |
| 8,322,976 | B2 * | 12/2012 | Chila et al. | 415/135 |
| 2007/0006590 | A1 | 1/2007 | Muldoon et al. | |
| 2007/0214793 | A1 | 9/2007 | Harris | |
| 2009/0272123 | A1 | 11/2009 | Sadil et al. | |
| 2011/0223026 | A1 | 9/2011 | Benjamin et al. | |
| 2014/0060078 | A1 * | 3/2014 | Stoia et al. | 60/796 |
| 2014/0223919 | A1 * | 8/2014 | Petty | 60/796 |

OTHER PUBLICATIONS

EP search report for EP 12187510 dated May 13, 2013.

* cited by examiner

Primary Examiner — William H Rodriguez

(74) Attorney, Agent, or Firm — O'Shea Getz P.C.

(57) ABSTRACT

A turbine engine fuel delivery system includes a mounting platform, a spray bar assembly and a leaf spring damper with a stack of a plurality of leaf springs. The stack includes a base segment connected longitudinally between a first spray bar contact segment and a second spray bar contact segment. The base segment is connected to the mounting platform and is located a first distance from the spray bar assembly. The first spray bar contact segment engages the spray bar assembly and is located a second distance from the mounting platform. The second spray bar contact segment engages the spray bar assembly and is located a third distance from the mounting platform.

18 Claims, 3 Drawing Sheets bly and is arranged in spaced relationship to the mounting platform. The second spray bar contact segment engages the spray bar assembly and is arranged in spaced relationship to the mounting platform.

The foregoing features and the operation of the invention will become more apparent in light of the following description and the accompanying drawings.

DETAILED DESCRIPTION OF THE INVENTION

LEAF SPRING DAMPER FOR A TURBINE ENGINE FUEL DELIVERY SYSTEM

This invention was made with government support under Contract No. N00019-02-C-3003 awarded by the United States Navy. The government may have certain rights in the invention.

CROSS-REFERENCE TO RELATED APPLICATIONS

This application is related to U.S. patent application Ser. No. 12/112,470, which is hereby incorporated by reference in its entirety, and is assigned to the assignee of the present invention.

BACKGROUND OF THE INVENTION

1. Technical Field

The present invention relates generally to turbine engines and, in particular, to a turbine engine fuel delivery system that includes a leaf spring damper.

2. Background Information

A gas turbine engine may include a central gas path that extends sequentially through a fan, a compressor, a combustor, a turbine, and an augmentor between a forward engine airflow inlet and an aft engine airflow exhaust. The augmentor may include a plurality of spray bar assemblies arranged within the central gas path. Each spray bar assembly typically extends from a first assembly end to a second assembly end, which may be connected to an end of a respective trailing edge box. Such spray bar assemblies are typically subject to engine vibrations that may reduce fuel delivery performance of the spray bar assemblies.

There is a need in the art for a device that damps vibrations within a spray bar assembly.

SUMMARY OF THE DISCLOSURE

According to a first aspect of the invention, a fuel delivery system for gas turbine engine includes a mounting platform, a spray bar assembly and a leaf spring damper with a stack of a plurality of leaf springs. The stack includes a base segment connected longitudinally between a first spray bar contact segment and a second spray bar contact segment. The base segment is connected to the mounting platform and is located a first distance from the spray bar assembly. The first spray bar contact segment engages the spray bar assembly and is located a second distance from the mounting platform. The second spray bar contact segment engages the spray bar assembly and is located a third distance from the mounting platform.

According to a second aspect of the invention, a gas turbine engine augmentor includes a flame holder with a mounting platform, a spray bar assembly and a leaf spring damper with a stack of a plurality of leaf springs. The stack includes a base segment connected longitudinally between a first spray bar contact segment and a second spray bar contact segment. The base segment is connected to the mounting platform and is arranged in spaced relationship to the spray bar assembly. The first spray bar contact segment engages the spray bar assembly and is arranged in spaced relationship to the mounting platform. The second spray bar contact segment engages the spray bar assembly and is arranged in spaced relationship to the mounting platform.

Figure 1:
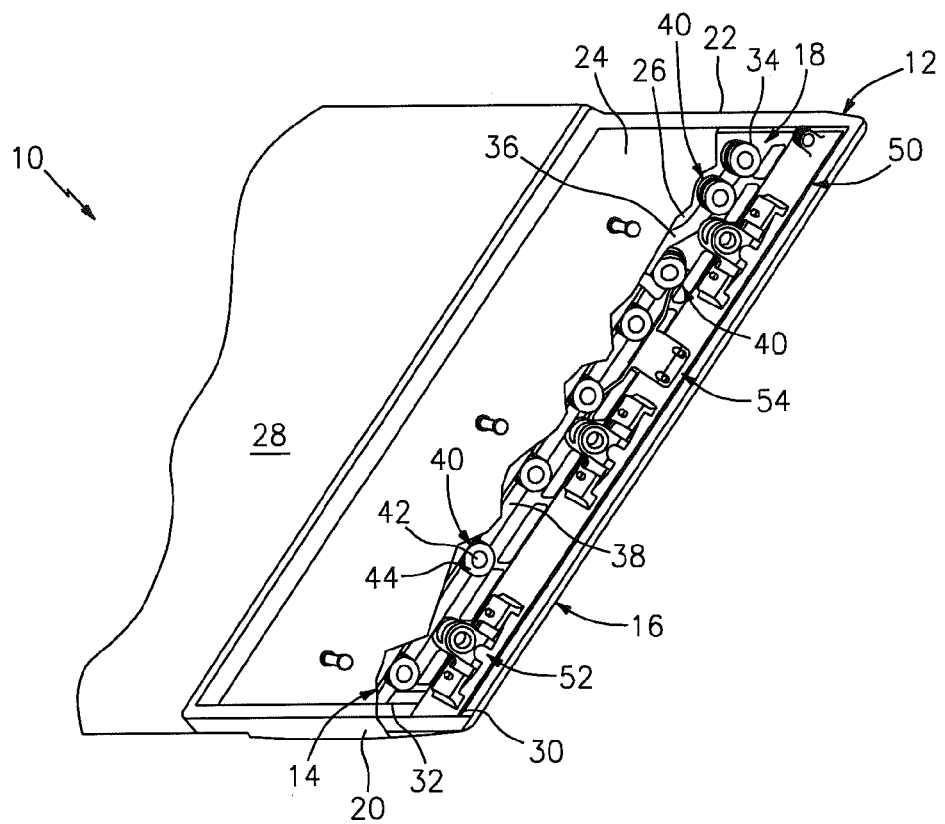
FIG. 1 is a perspective illustration of a portion of a gas turbine engine augmentor.

FIG. 1 illustrates a portion of a gas turbine engine augmentor 10. The augmentor 10 includes a trailing edge box 12, a spray bar assembly 14 and a flame holder assembly 16.

The trailing edge box 12 includes an inner box cavity 18 that extends radially between a radial inner endwall 20 and a radial outer endwall 22. The inner box cavity 18 extends laterally (e.g., circumferentially) between a first box sidewall 24 and a second box sidewall 26. The inner box cavity 18 also extends axially from a turbine exhaust case strut 28 to a trailing edge box aperture 30.

Figure 2:
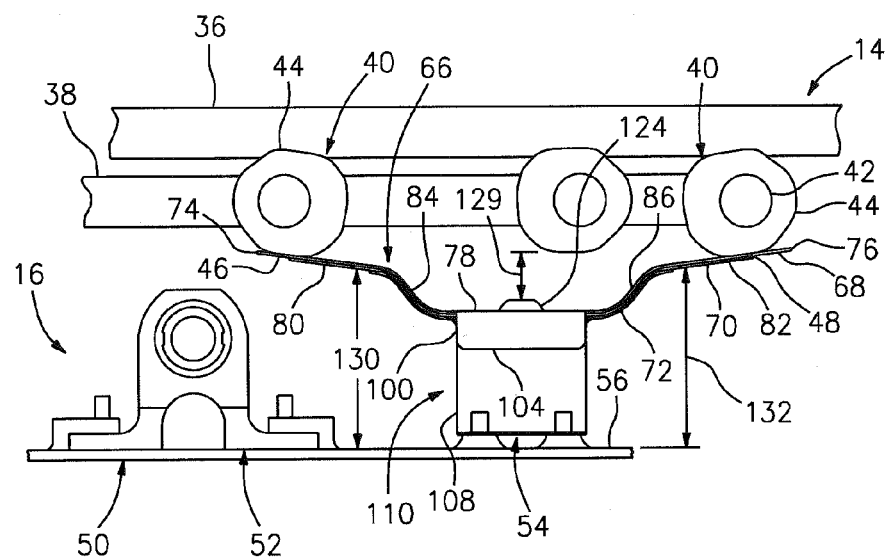
FIG. 2 is a side illustration of a portion of a flame holder assembly included in the augmentor illustrated in FIG. 1.

The spray bar assembly 14 extends longitudinally (e.g., radially and axially) between a first spray bar end 32 and a second spray bar end 34. The spray bar assembly 14 may include one or more fuel conduits 36 and 38, each having one or more spray bar nozzle assemblies 40. Each spray bar nozzle assembly 40 may include a nozzle 42 that extends laterally from a respective one of the fuel conduits 36, 38 through an injector wear block 44. Referring to FIG. 2, each injector wear block 44 may include a wear block flat, e.g., 46 or 48. An example of an alternative spray bar assembly configuration is disclosed in U.S. Pat. Nos. 7,647,775 and 7,578,131, each of which is hereby incorporated by reference in its entirety, and is assigned to the assignee of the present invention.

Figure 3:
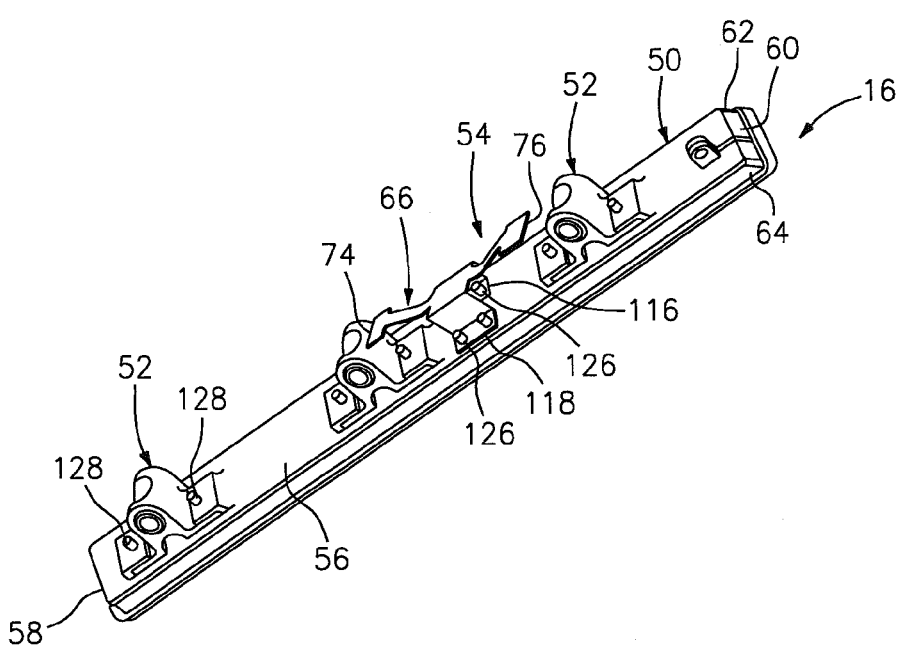
FIG. 3 is a perspective illustration of the flame holder assembly included in the augmentor illustrated in FIG. 1.

Referring to FIG. 3, the flame holder assembly 16 may include a mounting platform 50 (e.g., an impingement sheet assembly), one or more attachment lugs 52, and a leaf spring damper 54. The mounting platform 50 has a mounting surface 56 that extends longitudinally between a first platform endwall 58 (e.g., a radial inner endwall) and a second platform endwall 60 (e.g., a radial outer endwall). The mounting surface 56 also extends laterally between a first platform sidewall 62 and a second platform sidewall 64. An example of an attachment lug is disclosed in U.S. patent application Ser. No. 12/112,470.

The leaf spring damper 54 includes a stack 66 of a plurality of leaf springs. The stack 66 illustrated in FIG. 2, for example, includes a first leaf spring 68, a second leaf spring 70 and a third leaf spring 72. The stack 66 extends longitudinally between a first stack end 74 and a second stack end 76. The stack 66 may include a base segment 78, a first spray bar contact segment 80, a second spray bar contact segment 82, a first transition segment 84 and a second transition segment 86. The base segment 78 is connected longitudinally between the first spray bar contact segment 80 and the second spray bar contact segment 82, and extends longitudinally between the first transition segment 84 and the second transition segment

86. The first spray bar contact segment 80 extends longitudinally between the first transition segment 84 and the first stack end 74. The second spray bar contact segment 82 extends longitudinally between the second transition segment 86 and the second stack end 76. The first transition segment 84 and the second transition segment 86 may each have a (e.g., compound) curved and/or stepped sectional geometry.

Figure 4:
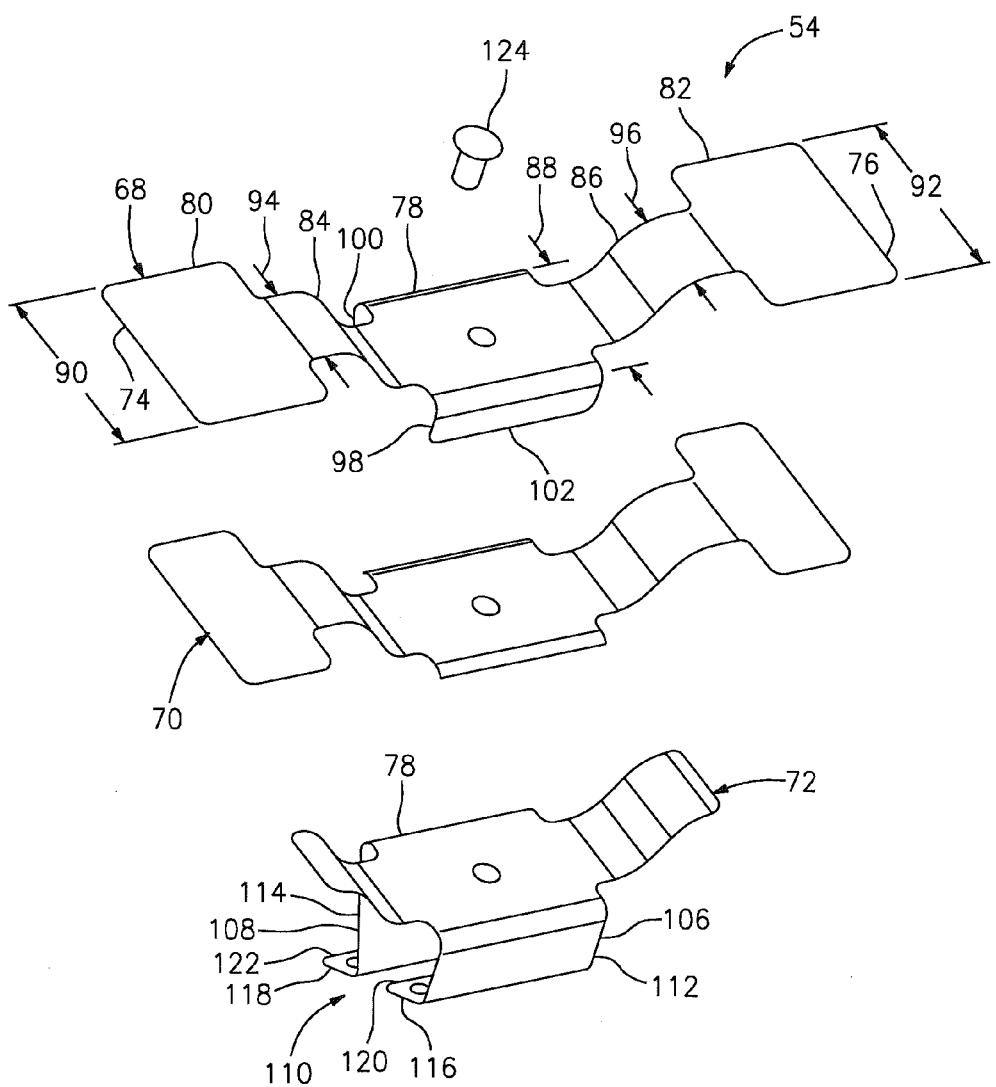
FIG. 4 is an exploded perspective illustration of a leaf spring damper included in the flame holder assembly illustrated in FIGS. 2 and 3.

Referring to FIG. 4, the base segment 78 has a lateral base segment width 88. The first spray bar contact segment 80 and the second spray bar contact segment 82 each have a respective lateral contact segment width 90, 92. The first transition segment 84 and the second transition segment 86 each have a respective lateral transition segment width 94, 96. The base segment width 88 may be greater than each of the transition segment widths 94 and 96. Each of the contact segment widths 90 and 92 may also be greater than each of the transition segment widths 94 and 96.

The first leaf spring 68 may extend longitudinally between the first stack end 74 and the second stack end 76. The first leaf spring 68 may also extend laterally, in the base segment 78, between an anti-rotation first flange 98 and an anti-rotation second flange 100. The first flange 98 and the second flange 100 may each extend transversely (e.g., radially and axially) from the first leaf spring 68 to a respective distal end 102, 104 (see also FIG. 2). Referring to FIG. 2, the second leaf spring 70 may extend longitudinally between the first spray bar contact segment 80 and the second spray bar contact segment 82 and, for example, partially into the first spray bar contact segment 80 and the second spray bar contact segment 82. The third leaf spring 72 may extend longitudinally between the first spray bar contact segment 80 and the second spray bar contact segment 82. Referring to FIG. 4, the third leaf spring 72 may also extend laterally, in the base segment 78, between a first mounting flange 106 and a second mounting flange 108, which may collectively form a damper mounting bracket 110. The first mounting flange 106 and the second mounting flange 108 may each respectively include a first flange segment 112, 114 and a second flange segment 116, 118. Each first flange segment 112, 114 may respectively extend transversely from the third leaf spring 72 to the second flange segment 116, 118. Each second flange segment 116, 118 may respectively extend (e.g., laterally) from the first flange segment 112, 114 to a distal flange end 120, 122.

Referring to FIGS. 2 and 3, the second leaf spring 70 may be stacked between the third leaf spring 72 and the first leaf spring 68. The second leaf spring 70 and the damper mounting bracket 110 may be seated (e.g., nested) between the first flange 98 and the second flange 100. At least one fastener 124 (e.g., a single rivet) may connect the first leaf spring 68, the second leaf spring 70 and the third leaf spring 72 together. The first flange 98 and the second flange 100 may reduce (or prevent) relative rotation between the damper mounting bracket 110 and the first leaf spring 68 and/or the second leaf spring 70 during engine operation.

Referring to FIG. 3, the second flange segments 116 and 118 are respectively connected to the mounting surface 56 with, for example, a plurality of fasteners 126 (e.g., rivets). Each of the attachment lugs 52 may also be connected to the mounting surface 56 with, for example, a plurality of fasteners 128 (e.g., rivets).

Referring to FIG. 1, the spray bar assembly 14 is arranged within the inner box cavity 18, and the first spray bar end 32 may be connected to the radial inner endwall 20. The mounting platform 50 may be mated with the trailing edge box aperture 30, and connected to the trailing edge box 12 using the attachment lugs 52. Referring to FIG. 2, the first spray bar contact segment 80 engages (e.g., contacts) and, for example, exerts a spring preload against the wear block flat 46. The second spray bar contact segment 82 engages and, for example, exerts a spring preload against the wear block flat 48. The spring preloads may be selected, for example, such that the contact segments 80 and 82 engage the spray bar assembly 14 throughout engine operation.

The base segment 78 is located a non-zero first distance 129 from the spray bar assembly 14. The first spray bar contact segment 80 is located a non-zero second distance 130 from the mounting surface 56, and the second spray bar contact segment 82 is located a non-zero third distance 132 from the mounting surface 56. The first spray bar contact segment 80 and the second spray bar contact segment 82 therefore are in spaced relationship to and may move transversely relative to the base segment 78 and the mounting surface 56 and, thus, may damp vibrations within the spray bar assembly 14 during engine operation. The damping may be provided from the flexing of the first transition segment 84 and/or the second transition segment 86, and/or from frictional sliding between the adjacent leaf springs (e.g., between 68 and 70, and/or 70 and 72).

In some embodiments, one or more of the leaf springs in the stack may have a different spring constant (also referred to as a spring rate); i.e., k (Newton/meters). In other embodiments, a plurality of the leaf springs may have substantially equal spring constants.

In some embodiments, a plurality of the leaf springs in the stack may have similar geometrical configurations.

Figure 5:
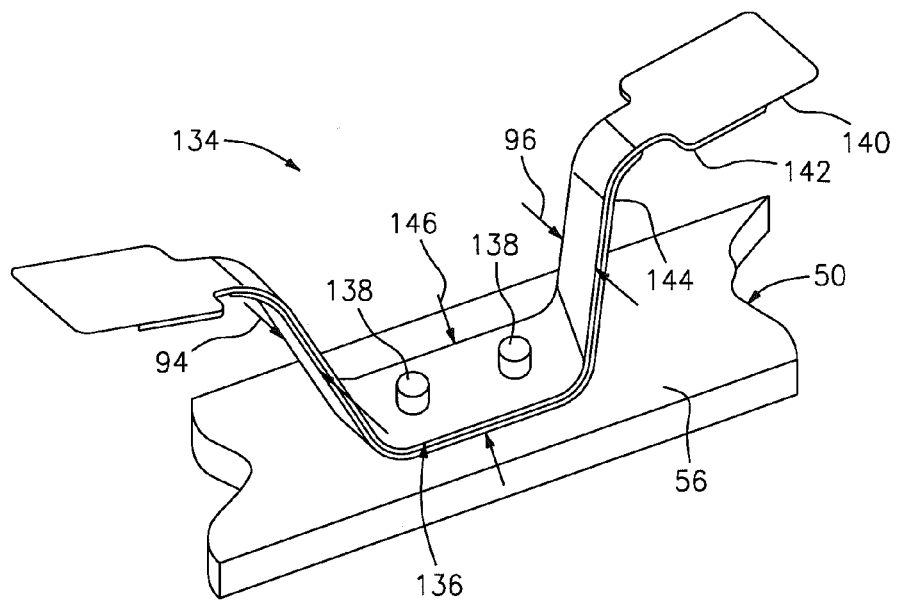
FIG. 5 is a perspective illustration of an alternate embodiment leaf spring damper.

FIG. 5 is a perspective illustration of an alternate embodiment leaf spring damper 134. In contrast to the leaf spring damper 54 illustrated in FIG. 2, the leaf spring damper 134 may be connected to and may contact the mounting platform 50 (e.g., without a damper mounting bracket). A base segment 136 of the leaf spring damper 134 stack, for example, may be fastened to the mounting surface 56 with a plurality of fasteners 138 (e.g., rivets). The fasteners 138 may also serve to reduce (or prevent) relative rotation between the leaf springs 140, 142, 144 and the mounting platform 50. In addition, a width 146 of the base segment 136 may be substantially equal to the transition segment widths 94 and 96.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A fuel delivery system for a gas turbine engine, comprising:
   a mounting platform;
   a spray bar assembly including a conduit and a nozzle;
   a leaf spring damper comprising a stack of a plurality of leaf springs, the stack comprising a base segment connected longitudinally between a first spray bar contact segment and a second spray bar contact segment, wherein the base segment is connected to the mounting platform and is located a first distance from the spray bar assembly, the first spray bar contact segment engages the spray bar assembly and is located a second distance from the mounting platform, and the second spray bar contact segment engages the spray bar assembly and is located a third distance from the mounting platform; and
   a flame holder assembly that includes the mounting platform.

2. The system of claim 1, wherein the stack further comprises a first transition segment extending between the base segment and the first spray bar contact segment, and a second transition segment extending between the base segment and the second spray bar contact segment.

3. The system of claim 2, wherein a width of the first spray bar contact segment is greater than a width of the first transition segment, and a width of the second spray bar contact segment is greater than a width of the second transition segment.

4. The system of claim 2, wherein a width of the base segment is greater than a width of the first transition segment and a width of the second transition segment.

5. The system of claim 1, wherein the stack extends longitudinally between a first stack end and a second stack end, and wherein the plurality of leaf springs comprise a first leaf spring that extends between the first stack end and the second stack end, and a second leaf spring that extends partially into and between the first spray bar contact segment and the second spray bar contact segment.

6. The system of claim 5, wherein the plurality of leaf springs further comprise a third leaf spring that extends between the first spray bar contact segment and the second spray bar contact segment.

7. The system of claim 1, wherein the stack extends longitudinally between a first stack end and a second stack end, and wherein the plurality of leaf springs comprise a first leaf spring that extends between the first stack end and the second stack end, and a second leaf spring that extends between the first spray bar contact segment and the second spray bar contact segment.

8. The system of claim 1, wherein the plurality of leaf springs comprise a first leaf spring and a second leaf spring, the first leaf spring extending laterally in the base segment between a first flange and a second flange, and wherein the second leaf spring is seated between the first flange and the second flange.

9. The system of claim 8, wherein the leaf spring damper further comprises a mounting bracket that connects the base segment to the mounting platform, and that is seated between the first flange and the second flange.

10. The system of claim 1, wherein the plurality of leaf springs are connected together with a single fastener.

11. The system of claim 1, wherein the base segment contacts the mounting platform.

12. The system of claim 1, wherein the leaf spring damper further comprises a mounting bracket that connects the base segment to the mounting platform.

13. The system of claim 12, wherein the plurality of leaf springs comprises a first leaf spring and a second leaf spring that extends laterally in the base segment between a first mounting flange and a second mounting flange, and wherein the first mounting flange and the second mounting flange form the mounting bracket.

14. The system of claim 1, wherein the spray bar assembly comprises a first injector wear block and a second injector wear block, and wherein the first spray bar contact segment contacts the first injector wear block, and the second spray bar contact segment contacts the second injector wear block.

15. The system of claim 1, wherein the flame holder assembly is connected to a turbine engine augmentor trailing edge box.

16. A gas turbine engine augmentor, comprising:
a flame holder comprising a mounting platform;
a spray bar assembly including a conduit and a nozzle; and
a leaf spring damper comprising a stack of a plurality of leaf springs, the stack comprising a base segment connected longitudinally between a first spray bar contact segment and a second spray bar contact segment, wherein the base segment is connected to the mounting platform and is arranged in spaced relationship to the spray bar assembly, the first spray bar contact segment engages the spray bar assembly and is arranged in spaced relationship to the mounting platform, and the second spray bar contact segment engages the spray bar assembly and is arranged in spaced relationship to the mounting platform;
wherein the stack extends longitudinally between a first stack end and a second stack end, and wherein the plurality of leaf springs comprise a first leaf spring that extends between the first stack end and the second stack end, and a second leaf spring that extends partially into and between the first spray bar contact segment and the second spray bar contact segment.

17. The system of claim 16, wherein the stack further comprises a first transition segment extending between the base segment and the first spray bar contact segment, and a second transition segment extending between the base segment and the second spray bar contact segment.

18. The system of claim 16, wherein the plurality of leaf springs further comprise a third leaf spring that extends between the first spray bar contact segment and the second spray bar contact segment.

* * * * *